United States Patent [19]

Cannon et al.

[11] Patent Number: 4,858,047
[45] Date of Patent: Aug. 15, 1989

[54] FINE HEAD POSITIONING SYSTEM FOR A TAPE BACKUP DRIVE

[75] Inventors: Thomas G. Cannon, Loveland; Bruce D. Roemmich, Fort Collins; Terry A. Precht, Loveland, all of Colo.

[73] Assignee: Colorado Memory Systems, Inc., Loveland, Colo.

[21] Appl. No.: 280,507

[22] Filed: Dec. 6, 1988

[51] Int. Cl.[4] ................................................ G11B 5/54
[52] U.S. Cl. ...................................... 360/106; 360/109
[58] Field of Search ........................ 360/106, 109, 77–78

[56] References Cited

U.S. PATENT DOCUMENTS

| | | | |
|---|---|---|---|
| 3,556,534 | 1/1971 | Bara et al. | 179/100 |
| 3,715,523 | 2/1973 | Rousseau et al. | 179/100 |
| 4,313,143 | 1/1982 | Zarr | 360/100 |
| 4,630,145 | 12/1986 | Thompson et al. | 360/77 |
| 4,647,994 | 3/1987 | Irwin et al. | 360/85 |
| 4,713,707 | 12/1987 | Heizmann | 360/106 |
| 4,717,979 | 1/1988 | Ichinose | 360/109 X |
| 4,747,004 | 5/1988 | Kukreja | 360/100 |
| 4,750,068 | 6/1988 | Akasaki et al. | 360/106 |

*Primary Examiner*—John H. Wolff
*Attorney, Agent, or Firm*—Dorr, Carson, Sloan & Peterson

[57] ABSTRACT

A tape head positioning system for a tape cartridge drive data backup system having a stepper motor with a lead screw connected to the stepper motor and a follower nut threadedly engaging the lead screw. The follower nut has a formed slot for receiving one end of a lever arm. The other end of the lever arm engages in a formed slot a head mounting assembly carrying the tape head and the lever arm is pivoted a first predetermined distance from the first end and a second predetermined distance from the second end. The ratio of the first predetermined distance to the second predetermined distance determines a mechanical advantage for the system thereby causing an inexpensive coarser motor to effectuate fine adjustments of the tape head.

7 Claims, 5 Drawing Sheets

FINE HEAD POSITIONING SYSTEM FOR A TAPE BACKUP DRIVE

BACKGROUND OF THE INVENTION

1. Field of the Invention

This invention relates to a head positioning apparatus for tape recording heads and, more particularly, to a fine pitch lead screw and lever arm system for positioning a head in a tape cartridge back-up drive for data storage systems for personal computers.

2. Statement of the Problem

In tape cartridge back-up systems for personal computers, parallel tracks of data are recorded on a tape media in a data cartridge. A recording head with a single read/write gap must be positioned on the tracks such that the head gap centerline is within a prescribed dimensional tolerance of the recorded track centerline.

The problem of such track positioning has been addressed in other magnetic media devices which require a head to be positioned or repositioned to different tracks located on the media. For example, magnetic disk storage systems use stepper motors with lead screws to directly drive the head or use a band wrapped around a post in conjunction with a pivoting arm to position a head over the disk shaped media. Lever arms have been used to position the recording head.

In Thompson, "Fine Positioning Apparatus for Floppy Disk Drive", U.S. Pat. No. 4,630,145, two stepper motors are used to provide a coarse and a fine positioning to a read/write head. The first stepper motor engages a first lead screw which directly moves the head carriage to provide coarse adjustment. The second stepper motor is connected to a second lead screw which causes the first lead screw and the head carriage to move in fine adjustment.

In previous tape drives using tape cartridges, the head is positioned by directly driving the head with a lead screw and a follower nut on the lead screw. This method, although simple and straight forward, limits the resolution of the head positioning as a function of the pitch of the lead screw. Hence, a stepper motor is required having a very fine step increment for adequate positioning accuracy. In one commercial approach a spiral surface cam mounted to a stepper motor uses a lever arm actuated by the cam surface to position the recording head. While this approach uses the mechanical advantage of the lever arm, the cam is only able to rotate one full revolution. Hence, a very precise cam with a fine step increment on the stepper motor is required to obtain adequate accuracy in positioning of the head.

A need exists for a head positioning system which has combined the mechanical advantage of a fine pitched leadscrew/follower nut with a lever arm to maximize the resolution in positioning the recording head while at the same time minimizing the costs of the overall assembly.

3. Solution to the Problem

The present invention provides a solution to the problem by obtaining very accurate positioning of the head through use of a follower nut on a fine pitch lead screw which, in turn, actuates a lever arm with a further reduction ratio.

The present invention uses a fine pitched lead screw with a follower nut having mating threads The follower nut has a slot that captures one end of the lever arm. The lever arm has a pivot point such that the other end of the lever arm is captured in a second slot in the mount for the head. The slots prevent rotation from occurring about the shaft of the stepper motor. Since this end of the lever arm is shorter than the other end, a mechanical advantage of a predetermined ratio is obtained. This combination allows for precise accuracy in positioning the head without the use of a costly stepper motor having fine step increments.

In addition, the present invention places both the stepper motor and the drive motor for the tape cartridge on the same chassis with the drive shafts of both motors extending inwardly into the center of the tape cartridge back-up system in parallel relationship. This arrangement unlike commercial approaches which have the stepper motor and the drive motor on opposing supports allows for lower cost construction while at the same time greater positional accuracy for the head with respect to the tape cartridge.

SUMMARY OF THE INVENTION

A tape head positioning system for a tape cartridge drive backup system is set forth.

A stepper motor is mounted on the chassis of the system. A lead screw is connected to the stepper motor and a follower nut threadedly engages the lead screw. The follower nut has a formed slot. One end of a lever arm engages the formed slot of the follower nut. The other end of the lever arm engages a head mounting assembly A pivot is provided at a first predetermined distance from the end engaging the formed slot of the follower nut The pivot point is located a second predetermined distance from the end of the lever arm engaging the head mounting assembly The ratio between the first predetermined distance and the second predetermined distance forms a mechanical advantage for the system. The conventional tape head is mounted to the head mounting assembly In a second aspect of the present invention, a tape drive motor is mounted on the chassis carrying the stepper motor. Both the stepper motor and the tape drive motor have their shafts extending in the same direction from the chassis.

DESCRIPTION OF THE PREFERRED EMBODIMENT

Figure 1:
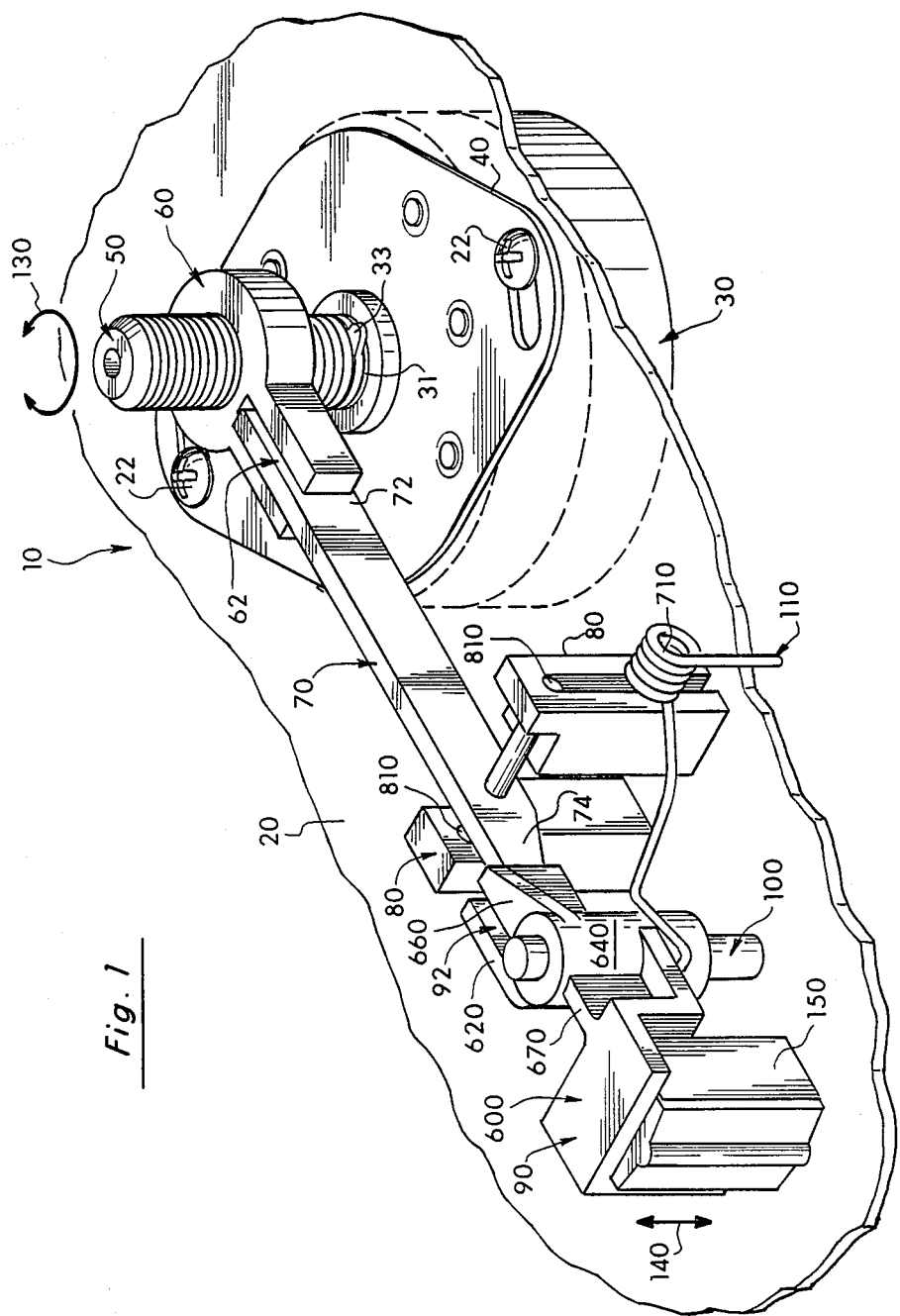
FIG. 1 is a perspective view of the tape head positioning system of the present invention mounted on a chassis.

The head positioning system of the present invention 10 is shown in FIG. 1. In FIG. 1, a base plate 20 is shown to which is mounted a stepper motor 30 by means of a mounting ears 40. The stepper motor 30 is connected to a lead screw 50 which, in turn, engages a follower nut 60. The follower nut 60 engages a lever arm 70 which in turn engages a pivot mount 80. The remaining end of the lever arm 70 is connected to a head mount 90 which slidingly engages a guide pin 100. A spring 110 biases the head in an upward direction.

For example, when the stepper motor turns in the direction of arrow 130, the head moves in an upward or downward direction 140. Of course, the stepper motor 30 can move in either direction and, therefore, the head can be positioned upwardly or downwardly.

The stepper motor 30 is mounted to the chassis 20 and has mounted to its shaft a lead screw 50 having a pitch which has a fineness specified by design requirements. The follower nut 60 is threaded onto the lead screw 50 and has extending forwardly a slot 62 with a horizontal surface 452 that retains the rearward end 72 of lever arm 70. The lever arm 70 has a pin 120 firmly mounted in it that allows lever arm 70 to be retained in the pivot mount 80. The lever arm 70 and pin 120 both rotate about radiused pivot 810 and drives the head mount 90 carrying the head 150 up and down the guide pin 100 located in the chassis 20. The head mount 90 also contains a second slot 92 with a horizontal surface 622 (shown in FIG. 5) for retaining the second end 74 of the lever arm 70. Slots 62 and 92 prevent rotation from occurring about the shaft of the stepper motor 30 and about pin 100. Spring 110 provides a load to the underside of the head mount 90 that eliminates any slack in the system 10 of the present invention.

In the arrangement shown in FIG. 1, the slot 62 of the follower nut 60 is aligned with slot 92 of the head mounting assembly 90 along a linear path defined by lever 70. This arrangement provides a direct coupling between the action of the stepper motor (arrows 130) and the head movement (arrows 140).

Each of the various components of the present invention will now be discussed in detail.

1. Stepper Motor Assembly

Figure 2:
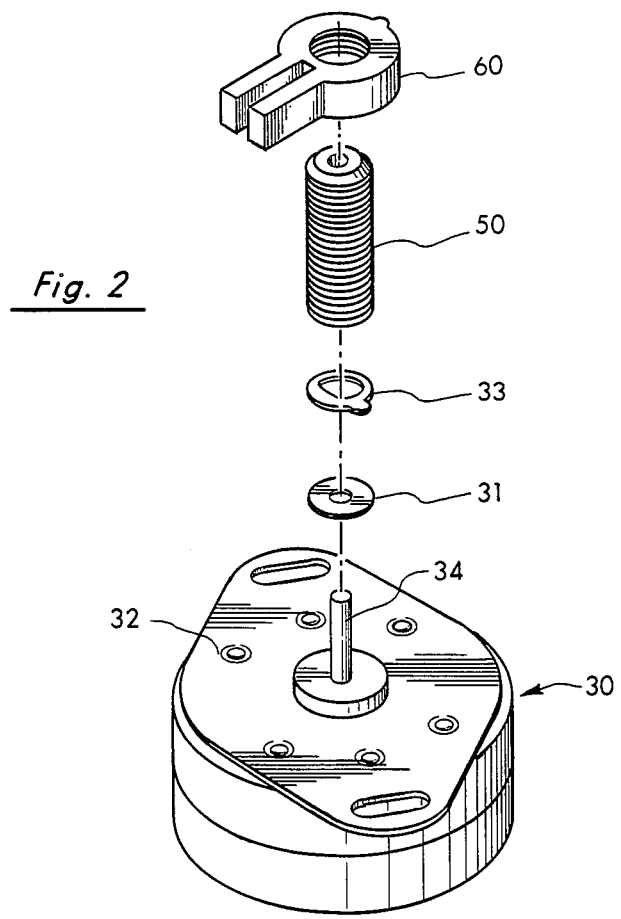
FIG. 2 sets forth the details of the stepper motor, lead screw, and follower nut of the present invention.

In FIG. 2, the details of the stepper motor assembly are set forth. The stepper motor 30 is a conventional stepper motor available from Seiko Epsen, Corp., 3-5, Owa 3-Chome, Suwa-shi, Nagano-Ken, 392 Japan and has a preferred maximum motor resolution of 48 steps per revolution. The stepper motor has a mounting plate 32 and a shaft 34. A teflon washer 31 is provided over the shaft 34. Over the teflon washer 31 is provided a track reference stop 33 and the lead screw 50. Affixed to the lead screw 50 with an adhesive is the follower nut 60. The track reference stop is firmly affixed by means of an adhesive to the bottom threads of the lead screw 50. The follower nut 60 is then threaded over the lead screw 50 until it hits the reference stop 33.

As shown in FIG. 1, the mounting ears 40 mounts over the chassis 20 and two screws 22 are used to affix the stepper motor 30 to the chassis 20.

It is to be expressly understood that a variety of different stepper motors could be used under the teachings of the present invention.

2. Lead Screw 50

Figure 3:
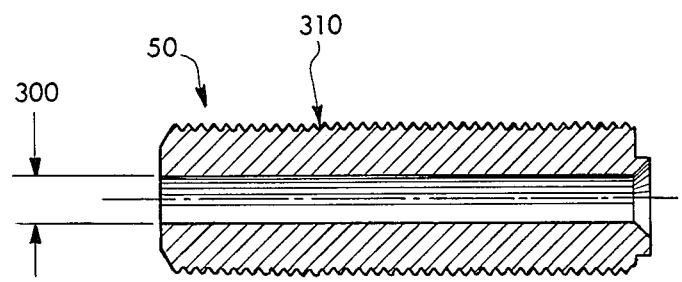
FIG. 3 is a side cut-away view of the lead screw of the present invention.

In FIG. 3, the details of the lead screw 50 are shown. Lead screw 50 has an internal passageway 300 which allows the lead screw 50 to be mounted over the shaft 34 of the stepper motor 30. In the preferred embodiment, the lead screw is machined from brass material and has a thread lead tolerance of plus or minus 0.0005 over the length of the screw. The threads 310 are, in a preferred embodiment, roll formed and are free of nicks and burs. The lead screw in the preferred embodiment has a fineness of 56 threads per inch. However, it is to be expressly understood that varying degrees of fineness could be utilized and that the lead screw could be machined under the teachings of the present invention based upon the required design parameters.

3. Follower Nut 60

Figure 4:
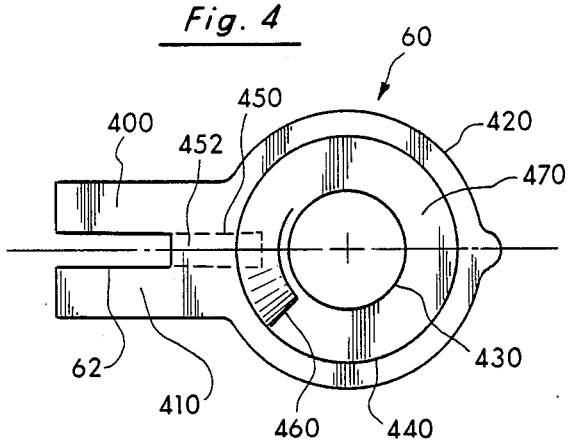
FIG. 4 is a top planar view of the follower nut of the present invention.

In FIG. 4, the details of the follower nut 60 are shown. The follower nut 60 has a formed slot 62 between two parallel and outwardly extending prongs 400 and 410. The prongs 400 and 410 are rectangular in shape and extend inwardly to a circular body portion 420. The circular body portion 420 has a formed inwardly and centered hole 430 and a formed annular recess 440. The formed hole 430 is threaded to receive and mate with the lead screw 50. The annular region 440 is directed downward towards the mounting ears 40 as the follower nut 60 is threaded onto the lead screw 50. In this orientation, a formed rectangular recess 450 is directed downwardly between the slot 62. A rise or catch 460 is provided on the face 470 of the annular region 440 to selectively engage the stop 33.

In the preferred embodiment, the follower nut 60 is made from VICTREX JCL-4536 EM available from LNP Engineering Plastics, a division of ICI Americas Inc., 412 King Street, Malvern, Pa.

4. Lever Arm 70

Figure 5:
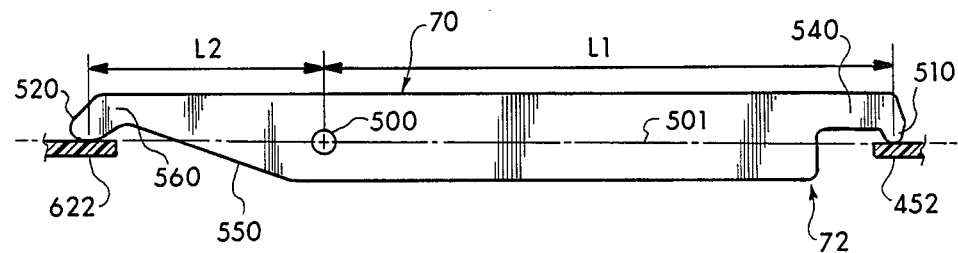
FIG. 5 is a side planar view of the lever arm of the present invention.

The lever arm 70 of the present invention is shown in FIG. 5 and is constructed from metal such as 6061 aluminum material The lever 70 has a first end 72 which engages slot 62 of the follower nut 60 and a second end 74 which engages the second slot 92 of the mounting head 90. The lever arm 70 has a hole 500 formed at a predetermined distance from end 72 so that a ratio between end 72 and end 74 is established. This is shown in FIG. 5 as distances L1 and L2. The ratio is established between L1 and L2 which provides the mechanical advantage of the present invention. In the present invention, L1 is 1.485 inches and L2 is 0.624 inches which provides a mechanical advantage of 2.38. This mechanical advantage allows the steps of the stepper motor 30 to be coarser and, yet, retain the precision of head movement. A coarser stepper motor may be several times less costly in price than a "fine step" stepper motor.

For example, if a conventional system uses an expensive 200 steps per revolution stepper motor with 32 threads per inch. The head would move vertically about 156 millionths of an inch with each step (i.e., $1/(32\times200)$). Under the teachings of the present invention, a much lower cost stepper motor achieves the same head movement. The present invention uses 48 steps per revolution stepper motor and a lead screw having 56 threads per inch. The mechanical advantage is 2.38 and, therefore, the head moves 156 millionths of an inch (i.e., $1/(2.38\times56\times48)$). The result is that a "coarser" step stepper motor can be used to effectuate fine movement of the head at a much lower overall cost.

End 72 has a first downwardly extending knob 510 which, in the arrangement of FIG. 1 abuts against surface 452 the recess 450. End 74 likewise has a knob 520 which likewise engages surface 622 of the mounting head assembly 90 in slot 92, as will be subsequently discussed. End 72 downwardly extends in region 530 into a outwardly extending region 540 carrying nut 510. End 74 incorporates an angularly extending region 550 which terminates in an outwardly extending region 560 containing knob 520.

The centerline of the radius of knob 520 lies on a straight line 501 with the center of pivot hole 500 and with the center of the knob 510 radius. When this relationship is not maintained then the controller for the stepper must correct for the geometric variation.

5. Head Mount 90

Figure 6:
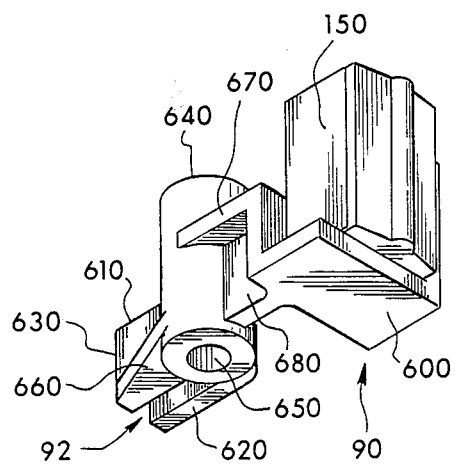
FIG. 6 is a perspective view of the head mounting assembly of the present invention.

The head mount 90 is shown in FIGS. 1 and 6 and is molded from a single resin piece such as that available from LNP known as catalog number JFL-4036.

The molded piece contains a head 150 mounting portion 600 to which the head 150 is epoxied to. Head 150 can be any suitable head design required under the design requirements of the system such as a dual gap head. In the preferred embodiment, the head 150 has less read/write gaps then the number of tracks on the tape. It also contains a portion 610 containing the formed slot 92. This portion contains two opposing substantially rectangular portions 620 and 630 which form slot 92 with horizontal surface 622. A cylindrical portion 640 having a formed hole 650 is disposed midway between portion 600 and slot 92. This portion 640 engages pin 100 as shown in FIG. 1. A support bridge 660 firmly engages prongs 620 and 630 to the cylindrical portion 640. Likewise, a bridge portion 670 firmly engages the cylindrical portion 640 to the head mounting portion 600. Bridges 660 and 670 are provided to strengthen the head mount 90. It is to be expressly understood that other configurations for constructing the head mount 90 could be designed which would still fall within the teachings of the present invention. A platform 680 engages the longitudinal length of the cylindrical portion 640 with the head mounting portion 600.

6. Packaging of Drive Motor in Chassis with Stepper Motor

Figure 7:
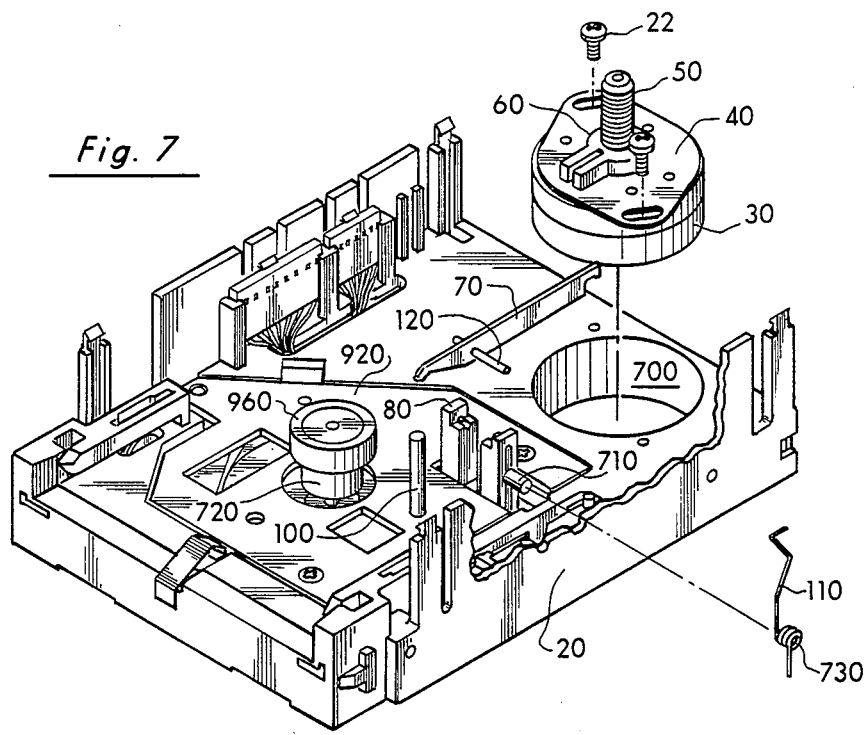
FIG. 7 is a perspective view of the chassis of the present invention showing the mounting of the stepper motor and of the drive motor.

In FIG. 7, the chassis of the present invention is shown. Parts of the chassis 20 which are not pertinent to the teachings of the present invention are not shown.

Figure 8:
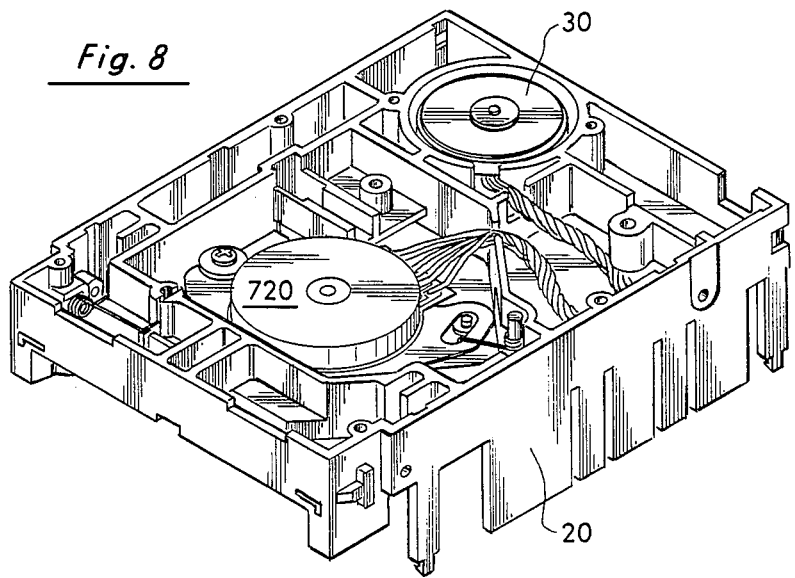
FIG. 8 is a bottom perspective view of the chassis shown in FIG. 7.

In FIG. 7, the assembly of the positioning system 10 of the present invention (as shown in FIG. 1) to a chassis 20 is set forth. Chassis 20 has a cavity 700 which receives the stepper motor 30. The screws 22 conventionally affix the mounting ears 40 to the upper surface of the chassis 20 as set forth in FIG. 1. One of the mounting posts 80 has an outwardly extending pin 710 which receives the center 730 of spring 110 as shown in FIG. 1. The mounting of the head mount 90 is not shown in FIG. 7 so that the drive motor 720 can be seen. As shown in FIGS. 7 and 8, the drive motor assembly 720 is mounted to the same chassis 20 as the stepper motor 30. Such an arrangement permits assembly of the stepper motor 30 and the drive motor assembly 720 to the same fixed chassis thereby providing for better alignment between the two motors in a more compact tape cartridge backup arrangement. The remaining details of chassis 20 are not important to the teachings of the present invention.

Figure 9:
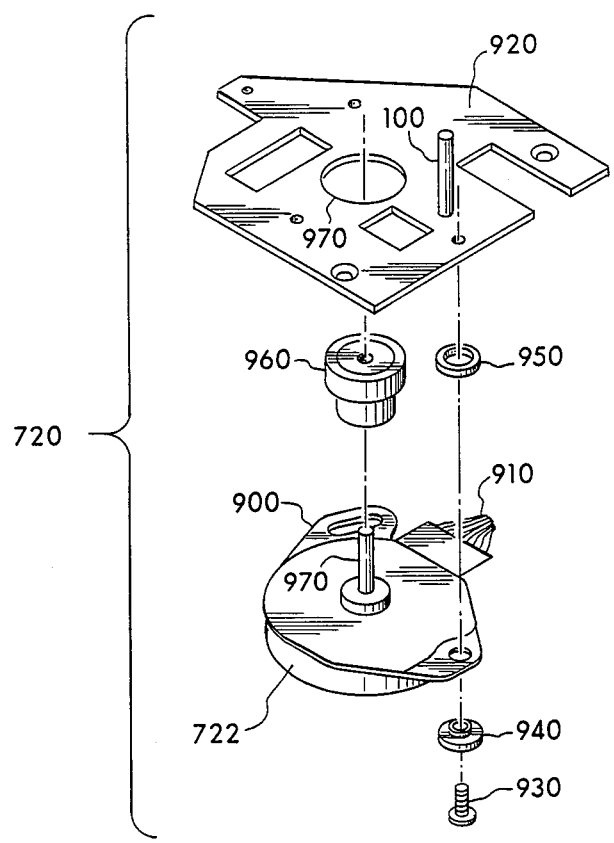
FIG. 9 is a perspective view showing the exploded assembly of the drive motor to a mounting plate.

In FIG. 9, the drive motor assembly 720 has the drive motor 722 shown with its mounting plate 900 and a set of cables 910 emanating from the drive motor 722. The mounting plate 900 is mounted to a motor plate 920 which, as shown in FIG. 7, is mounted to chassis 20. The mounting occurs through screw 930, a motor pivot 940, a shoulder washer 950, to the motor plate 920. A drive motor puck 960 is mounted on the shaft of the drive motor 722 and passes through opening 970 in motor plate 920. The puck 960 goes over the shaft 970 of the drive motor and is bonded to the motor shaft 970 in a conventional fashion. The puck 960 as shown in FIG. 7 is fitted through hole 970 in the motor plate 920 and is the mechanism by which the tape cartridge, not shown, is driven.

The present invention has both the tape drive motor and the stepper motor mounted with the motor portion located on the underside of the chassis and the shaft portion extending through the chassis into the interior of the chassis.

It is to be expressly understood that the claimed invention is not to be limited to the description of the preferred embodiment but encompasses other modifications and alterations within the scope and spirit of the inventive concept. For example, although slots 62 and 92 are set forth to prevent rotation in the present invention, it is to be expressly understood that other designs which accomplish this function could be used.

We claim:

1. A fine tape head positioning system for positioning a magnetic tape head, said system comprising:
    means for providing rotational bi-directional movement includes a shaft,
    means engaging said providing means for producing linear movement corresponding to said rotational movement,
    an elongated lever arm, said elongated lever arm having a first end engaging said producing means,
    means connected to said elongated lever arm for pivoting said elongated lever arm at a first predetermined distance from said first end,
    guide means oriented in the direction of said shaft,
    a head mounting assembly for carrying said head, said assembly having:
    a. a central portion having a formed hole for slidably engaging said guide means,
    b. a rear portion connected to said central portion, said elongated lever arm having a second end, opposing said first end, engaging said rear portion at a second predetermined distance from said means connected to said lever arm for pivoting said elongated lever arm said first predetermined distance being longer with respect to said second predetermined distance thereby forming a mechanical advantage, said elongated lever arm being aligned with the major axis of said shaft of said providing means, said connection of said elongated lever arm to said pivoting means, and said rear portion,
    c. a mounting portion connected to said central portion for carrying said head, and
        means connected to said assembly for biasing said assembly in a direction that firmly engages said rear portion against said second end of said elongated lever arm and firmly engages said first end of said elongated lever arm against said producing means so that as said shaft rotates, said first end of said elongated lever arm pivots in the direction of said linear movement thus causing said assembly to move in the direction opposite to said linear movement along said guide means thereby moving said head in spatial increments smaller due to said mechanical advantage than the relatively larger movement caused by said producing means.

2. The system of claim 1 wherein said providing means comprises:
   a stepper motor having an extending rotational shaft, and
   a lead screw connected to said shaft of said stepper motor.

3. The system of claim 2 wherein said guide means is a single pin.

4. The system of claim 2 wherein said elongated lever arm is substantially rectangular in shape.

5. A fine tape head positioning system for positioning a magnetic tape head, said system comprising:
   a stepper motor having an extending rotational shaft,
   a lead screw connected to said shaft of said stepper motor,
   a follower nut threadedly engaging said lead screw, said follower nut having a formed slot extending in a perpendicular outward direction from said shaft,
   an elongated lever arm, said lever arm having a first end engaging said formed slot of said follower nut,
   means connected to said lever arm for pivoting said lever arm at a first predetermined distance from said first end,
   guide means oriented in the direction of said shaft,
   a head mounting assembly for carrying said head, said assembly having:
   a. a central portion having a formed hole for slidably engaging said guide means,
   b. a rear portion connected to said central portion having a formed slot extending in a parallel outward direction from said lever arm, said lever arm having a second end, opposing said first end, engaging said rear portion formed slot at a second predetermined distance from said connection of said lever arm to said pivoting means, said first predetermined distance being longer with respect to said second predetermined distance thereby forming a mechanical advantage, said lever arm being aligned with the axis of said shaft, said formed slot of said of said follower nut, said connection of said lever to said pivoting means, and said rear portion formed slot.
   c. a mounting portion connected to said central portion for carrying said head, said mounting head portion being oriented in a direction opposite of the aforesaid slot, and
      means connected to said assembly for biasing said assembly in a direction that firmly engages said rear portion formed slot against said second end of said lever arm and that firmly engages said first end of said lever arm against said formed nut of said follower nut so that as said stepper motor rotates said first end of said lever moves in the direction of said rotation causing said assembly to move in the direction opposite to said rotation along said guide means thereby moving said head in spatial increments finer by said mechanical advantage than the movement of said follower nut.

6. A fine tape head positioning system for positioning a magnetic tape head, said system comprising:
   a chassis,
   a stepper motor mounted below said chassis, said stepper motor having a rotational shaft extending above said chassis,
   a lead screw connected to said shaft of said stepper motor,
   a follower nut threadedly engaging said lead screw, said follower nut having a formed slot extending in a perpendicular outward direction from said shaft,
   a lever arm of substantial rectangular construction, said lever arm having a first end engaging said formed slot of said follower nut,
   means mounted on said chassis and connected to said lever arm for pivoting said lever arm at a first predetermined distance from said first end,
   guide means mounted on said chassis,
   a head mounting assembly for carrying said head, said assembly having:
   a. a central portion having a formed hole for slidably engaging said guide means,
   b. a rear portion connected to said central portion having a formed slot extending in a parallel outward direction from said lever arm, said lever arm having a second end, opposing said first end, engaging said rear portion formed slot at a second predetermined distance from said connection of said lever arm to said pivoting means, said first predetermined distance being longer with respect to said second predetermined distance thereby forming a mechanical advantage, said lever arm being aligned with the axis of said shaft, said formed slot of said of said follower nut, said connection of said lever to said pivoting means, and said rear portion formed slot,
   c. a mounting portion connected to said central portion for carrying said head, said mounting head portion being oriented in a direction opposite of the aforesaid slot,
      means mounted to said chassis for biasing said assembly in a direction that firmly engages said rear portion formed slot against said second end of said lever arm and that firmly engages said first end of said lever arm against said formed nut of said follower nut so that as said stepper motor rotates said first end of said lever moves in the direction of said rotation causing said assembly to move in the direction opposite to said rotation along said guide means thereby moving said head in spatial increments finer by said mechanical advantage than the movement of said follower nut.

7. A fine tape head positioning system for positioning a magnetic tape head, said system comprising:
   a chassis,
   a stepper motor mounted below said chassis, said stepper motor having an extending rotational shaft extending through said chassis,
   a lead screw connected to said shaft of said stepper motor,
   a follower nut threadedly engaging said lead screw, said follower nut having a formed slot extending in a perpendicular outward direction from said shaft, said follower nut having a surface formed in said formed slot,
   a lever arm of substantial rectangular construction, said lever arm having a first end engaging said surface in said formed slot of said follower nut,
   means mounted on said chassis and connected to said lever arm for pivoting said lever arm at a first predetermined distance from said first end,
   a pin mounted on said chassis, a head mounting assembly for carrying said head, said assembly having:

a. a central cylindrical portion having a formed hole for slidably engaging said pin, b. a rear portion having a formed slot extending in an outward parallel direction to said lever arm, said formed slot of said rear portion having a surface formed in said slot, said lever arm having a second end, opposing said first end, engaging said rear portion surface at a second predetermined distance from said connection of said lever arm to said pivoting means, said first predetermined distance being longer with respect to said second predetermined distance thereby forming a mechanical advantage, said lever arm being aligned with the axis of said shaft, said surface of said of said follower nut, said connection of said lever to said pivoting means, and said rear portion surface, c. a mounting portion connected to said cylindrical portion for carrying said head, said mounting head portion being oriented in a direction opposite of said rear portion formed slot, means mounted to said chassis for biasing said assembly in a direction that firmly engages said surface of said rear portion formed slot against said second end of said lever arm and that firmly engages said first end of said lever arm against said surface of said follower nut so that as said stepper motor rotates said first end of said lever moves in the direction of said rotation causing said assembly to move in the direction opposite to said rotation along said pin thereby moving said head in spatial increments finer by said mechanical advantage than the movement of said follower nut.

* * * * *